(12) United States Patent
Ryan (10) Patent No.: US 12,169,270 B2
(45) Date of Patent: Dec. 17, 2024

(54) SYSTEM AND METHOD FOR LENS AND/OR CHROMATIC DISTORTION CORRECTION IN A DIGITAL MICROSCOPE

(71) Applicant: ASH TECHNOLOGIES LTD., Naas (IE)

(72) Inventor: Louis Ryan, Naas (IE)

(73) Assignee: ASH TECHNOLOGIES LTD. (IE)

( * ) Notice: Subject to any disclaimer, the term of this patent is extended or adjusted under 35 U.S.C. 154(b) by 332 days.

(21) Appl. No.: 17/609,594

(22) PCT Filed: May 7, 2020

(86) PCT No.: PCT/EP2020/062797
§ 371 (c)(1),
(2) Date: Nov. 8, 2021

(87) PCT Pub. No.: WO2020/225396
PCT Pub. Date: Nov. 12, 2020

(65) Prior Publication Data
US 2023/0013183 A1    Jan. 19, 2023

(30) Foreign Application Priority Data
May 7, 2019   (GB) ...................................... 1906377

(51) Int. Cl.
*G06T 7/00* (2017.01)
*G02B 21/00* (2006.01)
*G02B 21/36* (2006.01)

(52) U.S. Cl.
CPC ......... *G02B 21/364* (2013.01); *G02B 21/008* (2013.01); *G02B 21/361* (2013.01); *G06T 7/0002* (2013.01); *G06T 2207/10056* (2013.01)

(58) Field of Classification Search
CPC .................................................. G06T 7/0002
See application file for complete search history.

(56) References Cited

FOREIGN PATENT DOCUMENTS

WO    2017/140854 A1    8/2017

OTHER PUBLICATIONS

Paolo Di Febbo et al; "Real-time image distortion correction: Analysis and evaluation of FPGA-compatible algorithms", 2016 International Conference on Reconfigurable Computing and FPGAS (RECONFIG), Nov. 1, 2016, pp. 1-6.
David Eadie et al; "Correction of geometric image distortion using FPGAs", Proceedings of SPIE, vol. 4877, Mar. 17, 2003.
Hong Zheng et al; "Real-time correction of distortion image based on FPGA", Intelligent Computing and Integrated Systems (ICISS), 2010 International Conference on, IEEE, Piscataway, NJ, USA, Oct. 22, 2010, pp. 167-170.

*Primary Examiner* — Y Lee
(74) *Attorney, Agent, or Firm* — Clark Hill PLC; James R. Foley (57) ABSTRACT

The invention provides an integrated digital microscope system comprising a camera, a lens and a screen to view an object characterised in that an integrated circuit comprises a video buffer write block, a grid generator block, and a video buffer read block configured to correct lens distortion errors in an image appearing on said screen. The invention also provides an integrated digital microscope system configured to remove chromatic distortion errors.

9 Claims, 7 Drawing Sheets

SYSTEM AND METHOD FOR LENS AND/OR CHROMATIC DISTORTION CORRECTION IN A DIGITAL MICROSCOPE

This application is a National Phase Filing of PCT/EP2020/062797, having an International filing date of May 7, 2020, which claims priority of Great Britain Patent Application No. 1906377.5, having a filing date of May 7, 2019. The disclosure of the foregoing are hereby incorporated by reference.

FIELD

The disclosure relates to a digital microscope imaging system and method. The disclosure in particular relates to lens distortion calibration correction and/or chromatic distortion correction.

BACKGROUND

Digital microscope imaging systems are well known art in the art. Digital microscopes can be used in the measurement, verification or validation in a quality assurance process across many industries.

An integrated full HD (1080p) digital microscope and measurement system is known in the art. Such a microscope can provide a custom platform that incorporates a highly configurable and upgradeable set of inspection and measurement applications such as focus stacking, 2D measurement, side by side and overlay image comparison.

In a typical example an image processing and control engine can deliver full HD live video image quality at sixty frames per second enabling it to be utilised as a solution in a broad range of quality control, testing, rework, assembly, inspection and documentation tasks. A Graphical User Interface can be a mouse controlled Interface delivering intuitive and efficient operation and control of a full application suite. Camera control functions (auto and manual focus, exposure, gain, brightness, white balance) can be provided.

Current digital microscopes suffer from a number of problems including: Lens distortion errors; chromatic distortion errors; calibration errors; or camera zoom and focus errors.

Optical systems are not perfect and exhibit lens distortion which can include radial distortions known as pincushion and barrel, pincushion distortion is typically the most common type. For digital inspection systems this is an even more difficult problem as lens distortion correction must be done in real time with minimal latency.

Many companies use specific lenses to correct the distortion before the image reaches the actual camera. Another method is to use a mathematical algorithm such as Brown-Conrady model to find the relative k radial distortion coefficient to correct for radial distortion. For each magnification a k coefficient must be calculated and used to calculate the new x,y coordinates for the output image. This method is often implemented in software.

Using lenses to correct distortion adds a large cost to the product. The method of using a k coefficient can have problems with perspective where the new calculated values give inaccurate results. To achieve an accurate result the camera and object under the camera must be perfectly aligned. When used in software this method adds a large amount of latency to the point of not being feasible for a video system and only being used on still images.

Another problem with digital microscope imaging is chromatic distortion. Chromatic distortion (also called chromatic aberration) occurs when a lens fails to focus all colours on to the same point resulting in colours having different focal lengths. This appears as fringe colouring around the outer parts of the image. Depending on the nature of the lens different colours will appear on certain edges. Chromatic distortion is typically corrected for by incorporating additional corrective lenses which minimises the difference in focal lengths of different colours.

While corrective lenses typically give better results, they incur a significant cost penalty and increased complexity for the overall system, which is undesirable in many cases. Current digital post-processing on the other hand results in permanent loss of image detail.

Many patent publications exist in the art, for example US2015/0062369; US2018/0118180; U.S. Pat. No. 5,818,527; US2008/0193042; US2008/0291447 and US2012/0051666, however none of these publication effectively solve the lens distortion or the chromatic distortion problems.

It is therefore an object of the invention to provide an improved lens distortion and/or chromatic distortion correction in a digital microscope imaging system and method to overcome at least one of the above-mentioned problems.

SUMMARY

According to the present invention there is provided, as set out in the appended claims, digital microscope or imaging system comprising a camera, a lens and a screen to view an object characterised in that an integrated circuit comprises a video buffer write block, a grid generator block, and a video buffer read block configured to correct lens distortion errors in an image appearing on said screen.

Video real time lens distortion correction can be accomplished by implementing the system in hardware on a FPGA. Typically, Lens distortion correction requires the storage of a full frame of video in memory. As on chip memory is limited and expensive, it is not feasible to store a full frame. Instead, a partial frame is stored and implemented in a certain way to achieve 1080p lens distortion correction. The system and method obviates the need for a distortion correction lens, thereby increasing efficiency and reducing complexity.

In one embodiment the integrated circuit comprises a Field Programmable Gate Array (FPGA) device.

In one embodiment a pixel counter block connected to the grid generator block and configured for interpolating pixel coordinates between a plurality of grid points and providing the pixel information to the video read block.

In one embodiment the video write block stores pixel data in a format configured to accommodate for interpolation in the video read block.

In one embodiment there is provided at least four memory buffers wherein pixels are stored in such a way that a rectangular kernel of adjacent pixels surrounding the pixel of interest, (hereafter referred to as the 'kernel'), can be read at any time in a single clock cycle of the integrated circuit.

In one embodiment at least one memory buffer comprises a plurality of registers and a register can store at least two pixels.

In one embodiment the grid points are stored by a software application into a set of registers and read by the grid generator block wherein the register contains a 16-bit x and y coordinate and arranged in such a way so that any kernel registers can be read in a single clock cycle.

In one embodiment the video read block is configured to locate the correct pixels from the plurality of buffers and interpolate said pixels such that an image of the object appears on the screen without lens distortion.

In one embodiment video real time lens distortion correction to a resolution of 1080p is implemented by the integrated circuit.

In a further embodiment there is provided a method of displaying an image on a digital imaging system comprising a camera, a lens and a screen to view an object, an integrated circuit having a video buffer write block, a grid generator block, and a video buffer read block comprising the steps of correcting lens distortion errors in an image appearing on said screen.

In one embodiment a pixel counter block is configured to calculate coordinates on a per channel basis.

In one embodiment the video read block calculates the coordinates based on a 'k' value on the fly and the coordinates are calculated on a per channel basis provided by the pixel counter block and where a channel represents one colour component of a pixel.

In another embodiment there is provided an integrated digital microscope system comprising a camera, a lens and a screen to view an object characterised in that an integrated circuit comprises a video buffer write block and a video buffer read block configured to correct chromatic distortion errors in an image appearing on said screen.

In one embodiment there is provided a pixel counter block configured to calculate coordinates on a per channel basis and configured to correct chromatic distortion errors.

In one embodiment the video read block calculates the coordinates based on a 'k' value on the fly and the coordinates are calculated on a per channel basis provided by the pixel counter block.

There is also provided a computer program comprising program instructions for causing a computer program to carry out the above method which may be embodied on a record medium, carrier signal or read-only memory. In one embodiment there is provided computer program comprising program instructions for causing a computer to control the method.

BRIEF DESCRIPTION OF THE DRAWINGS

The invention will be more clearly understood from the following description of an embodiment thereof, given by way of example only, with reference to the accompanying drawings, in which:—

FIG. 12 is a grid. Interpolation is a known technique and can be used in the constructing of new data points from discrete known data points. The grid of FIG. 12 shows four coordinates points with a value contained within each point.

DETAILED DESCRIPTION OF THE DRAWINGS

Figure 1:
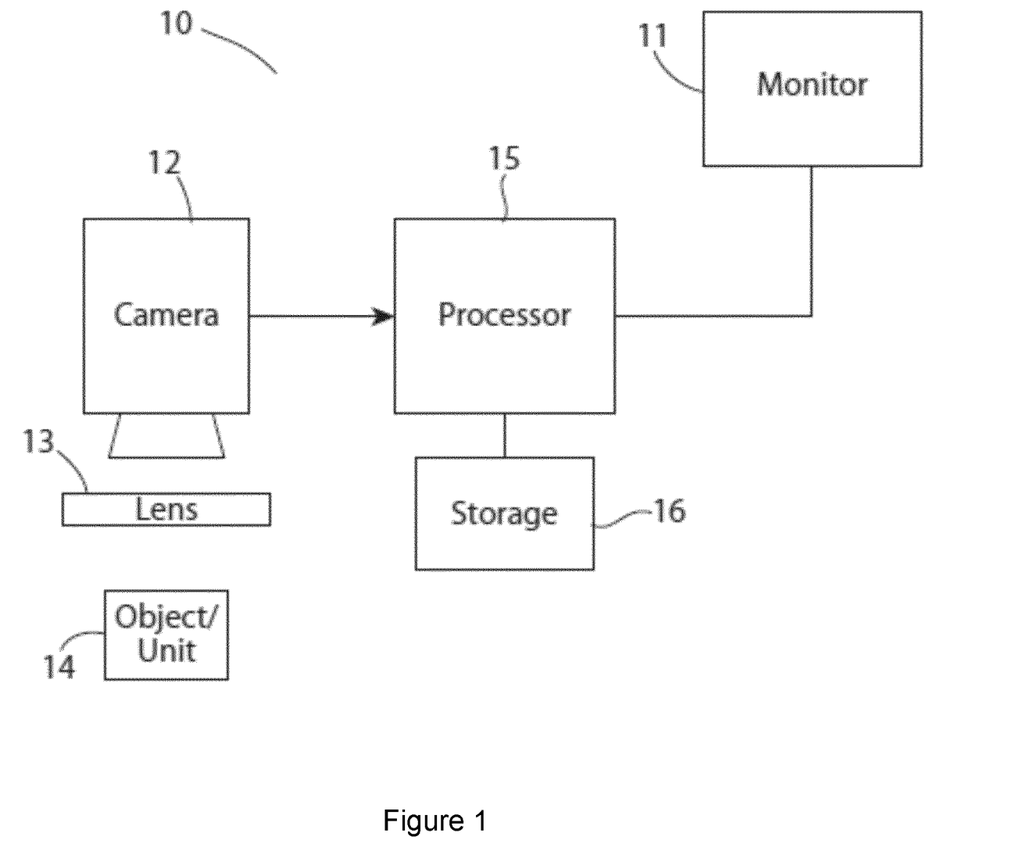
FIG. 1 illustrates an example architecture of the imaging system and method according to one embodiment of the invention.

FIG. 1 illustrates an example architecture of the imaging system and method according to one embodiment of the invention, indicated generally by the reference numeral 10. A monitor 11 displays an image to a user based on a captured image from a camera 12 and lens 13 combination. The image can be an object or unit under test 14 that the system can be configured to inspect. A processor 15 and storage module 16 to process and store data is provided. The imaging system can be hardware embodied as an integrated digital microscope such as a digital microscope sold under the trade name 'Omni' by the applicants of the present invention, see https://www.ashvision.com/products-2/digital-microscopes/omni/omni-core/.

Generation of digital graticules on a digital camera or monitor on a live video or static image of the object/unit can be selected by a user from a database of stored graticules form the storage module 16. Alternatively a user can generate a new graticule for use. The graticules are used to verify if an object is within or outside dimensional tolerances using a digitally generated overlay.

The processor 15 comprises an Integrated Circuit in the form of a FPGA (Field Programmable Gate Array) circuit. Video real time lens distortion correction is typically required and accomplished by implementing the system in hardware on the FPGA circuit. In one embodiment the FPGA is configured to achieve video lens distortion correction to a resolution of 1080p. The FPGA eliminates the need for a distortion correction lens. Small frame sizes can fit in the FPGA internal memory but for most FPGAs 1080p frame size will not fit in the FPGA internal RAM. 1080p frame size is 2 million pixels or 6 MByte RGB colour. The same embodiment is extendible to higher resolutions such as 4K and 8K but would require even greater amounts of FPGA on chip memory.

The storage of full frames of video prevents large frame sizes from being able to be processed in FPGAs without using external RAM which if used would present bandwidth limitations as the required access to the memory is not sequential. By using the internal RAM in a Xilinx® Zynq 7020 (0.6125 MByte RAM), for example, it is possible to do full 1080P lens distortion correction in 60 lines in either direction by a technique of only storing the range or sliding window of video data within a frame that is actually required for the correction.

Figure 2:
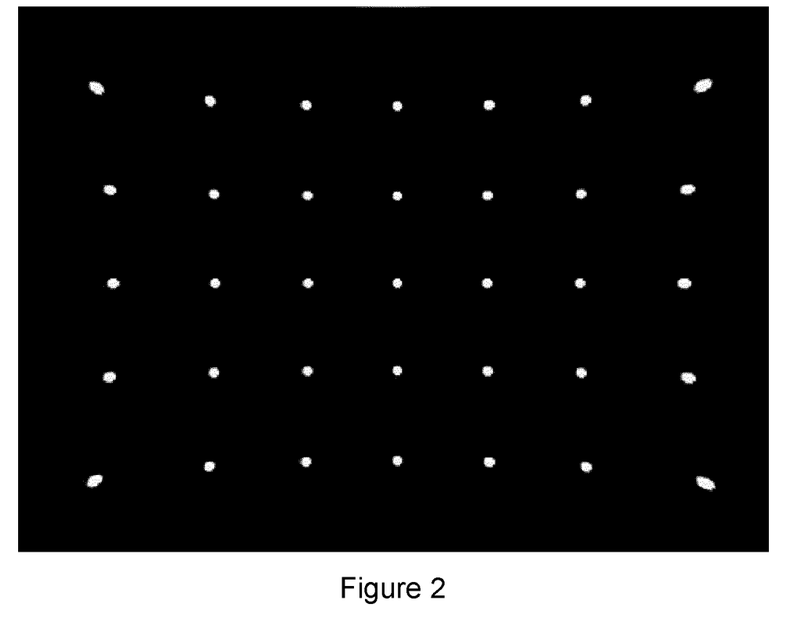
FIG. 2 illustrates distortion in an array of pixels.
Figure 3:
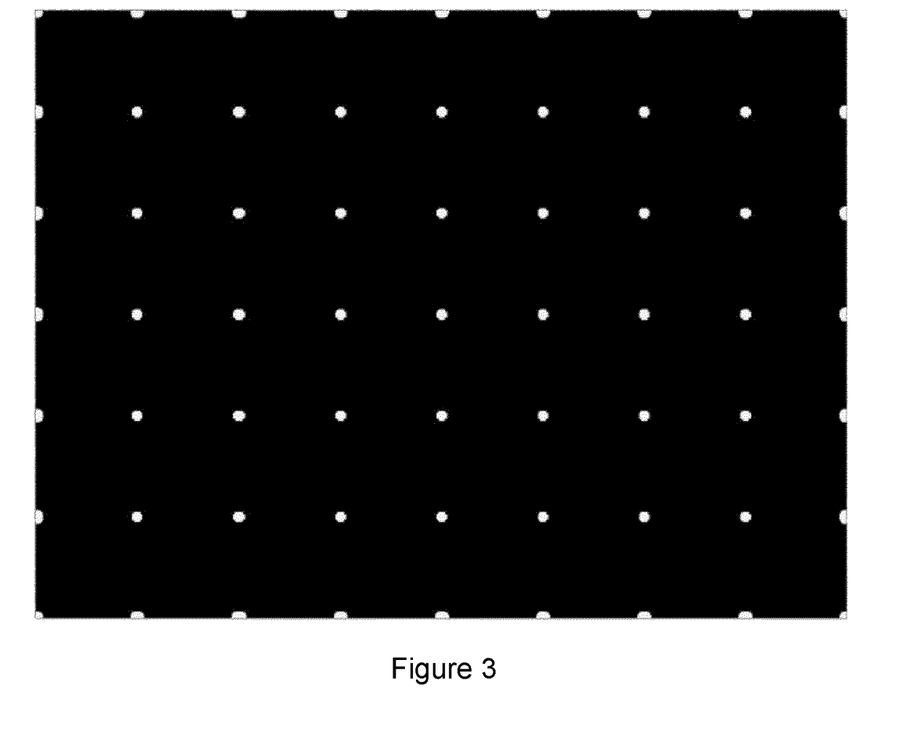
FIG. 3 illustrates a distortion corrected array of pixels.

In one embodiment the system corrects for lens distortion using a 19×19 uniformly distributed grid, a video buffer, a pixel counter and a line counter. The pixel counter and line counter, (PC & LC), indicate the current pixel being output. For example, when PC=0 and LC=0 the top leftmost pixel on the screen is currently being output. The pixel comes from the video buffer which stores 120 lines of video or 60 lines of video in front of and behind the pixel and line counters. How that pixel is chosen comes from interpolating between the grid points. When a picture of the grid is taken by the camera 12 the image is distorted, as shown in FIG. 2. FIG. 3 shows the corrected image.

The distance between the distorted and undistorted dots is the amount of correction needed at that particular magnification. To implement the correction the system needs to know the coordinates of these grid points. On the undistorted grid some consecutive middle points might have y values of 20, 20, 20, 20 since the image is straight while on the distorted grid these points would be 22, 24, 25, 27. The distortion from the lens has pushed these points down and curved the image. When LC=20, the pixels are taken from the line buffer and output 2, 4, 5 and 7 lines early. This pulls the points back up, thus straightening the image. Between the grid points interpolation determines which pixel to output.

Figure 12:
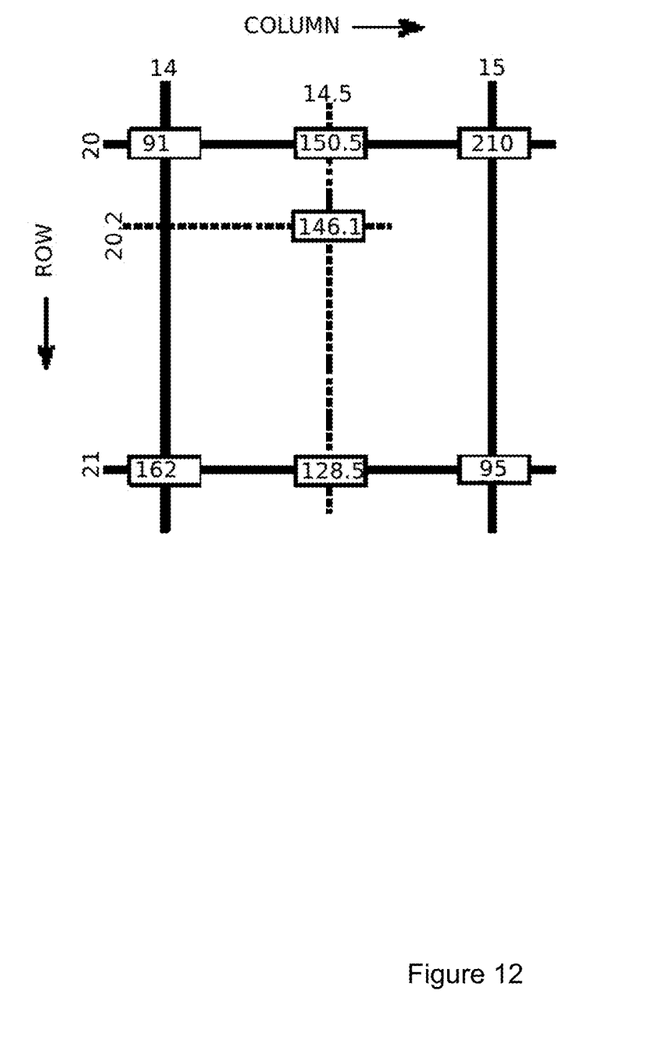

Interpolation is a known technique and can be used in the constructing of new data points from discrete known data points. The grid shown in FIG. 12 shows four coordinates points with a value contained within each point. The value we want to get is between these four points. By using the distance from the new point to the four other points a new value is constructed.

$$I_{20,14.5} = \frac{15-14.5}{15-14} \cdot 91 + \frac{14.5-14}{15-14} \cdot 210 = 150.5,$$

$$I_{21,14.5} = \frac{15-14.5}{15-14} \cdot 162 + \frac{14.5-14}{15-14} \cdot 95 = 128.5,$$

and then interpolating linearly between these values, giving $$I_{20.2,14.5} = \frac{21-20.2}{21-20} \cdot 150.5 + \frac{20.2-20}{21-20} \cdot 128.5 = 146.1.$$

This particular method of interpolation is known as bilinear interpolation and is the method used in one embodiment. It is implemented twice in the system, once for determining pixel coordinates and once for determining pixel values.

The system of the present invention can be broken down into four main blocks: a video buffer write block, a grid generator block, and a video buffer read block. A fourth block acts as a pixel counter that feeds into the grid generator and then the video read block. Each of these blocks can be incorporated on a FPGA chip or integrated circuit embodied as processor 15 shown in FIG. 1.

The video write block stores pixel data in a specific format to accommodate for interpolation in the video read block. Pixels much be stored in such a way that a kernel of pixels can be read at any time in 1 clock cycle. To do this four buffers are needed in a bilinear embodiment and pixels are stored as shown:

| A | B | A | B | A | B | A | B |
|---|---|---|---|---|---|---|---|
| C | D | C | D | C | D | C | D |
| A | B | A | B | A | B | A | B |
| C | D | C | D | C | D | C | D |

Structure of buffers A, B, C and D. For line 0 pixels are written alternating between buffers A and B. For line 1 buffers alternate between C and D. This pattern continues with buffers A and B containing all the even numbered lines while C and D contain all odd numbered lines. Also note that buffers A and C contain all the even numbered pixels while B and D contain the odd numbered pixels. This can be shown as:

| Line 0 | | | | | | | | Line 2 | | | Line 4 | | |
|---|---|---|---|---|---|---|---|---|---|---|---|---|---|
| 0 | 2 | ... | ... | 1916 | 1918 | 3840 | 3842 | ... | ... | 5756 | 5758 | 7680 | 7682 | ... | ... |

| Line 0 | | | | | | | | Line 2 | | | Line 4 | | |
|---|---|---|---|---|---|---|---|---|---|---|---|---|---|
| 1 | 3 | ... | ... | 1917 | 1919 | 3841 | 3843 | ... | ... | 5757 | 5759 | 7681 | 7683 | ... | ... |

| Line 1 | | | | | | | | Line 3 | | | Line 5 | | |
|---|---|---|---|---|---|---|---|---|---|---|---|---|---|
| 1920 | 1922 | ... | ... | 3836 | 3838 | 5760 | 5762 | ... | ... | 7676 | 7678 | 9600 | 9602 | ... | ... |

| Line 1 | | | | | | | | Line 3 | | | Line 5 | | |
|---|---|---|---|---|---|---|---|---|---|---|---|---|---|
| 1921 | 1923 | ... | ... | 3837 | 3839 | 5761 | 5763 | ... | ... | 7677 | 7679 | 9601 | 9603 | ... | ... |

Figure 4:
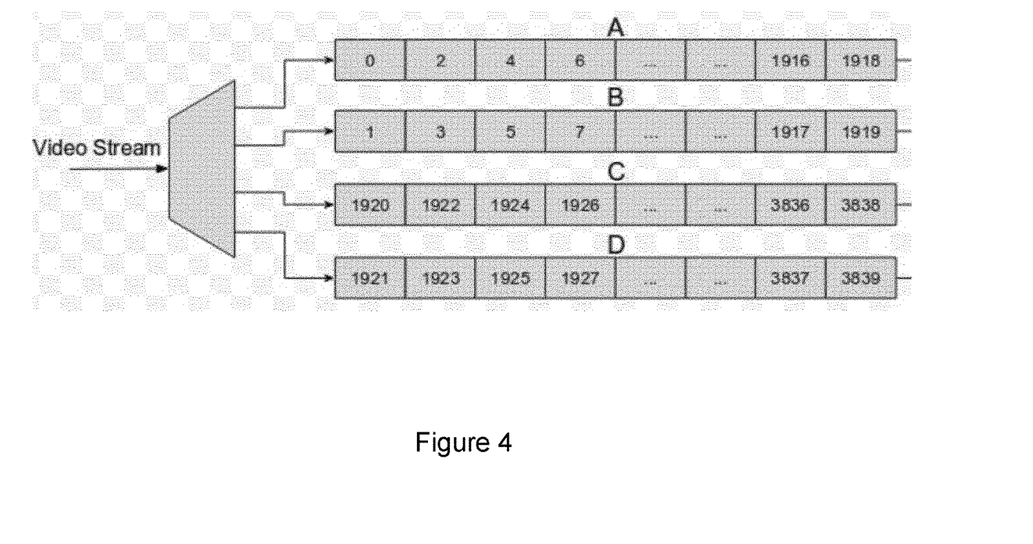
FIGS. 4 and 5 illustrates the format in which a video stream is de-multiplexed into a number of data streams and supplied to a number of buffers. This format allows a kernel to be read out in a single clock cycle.
Figure 5:
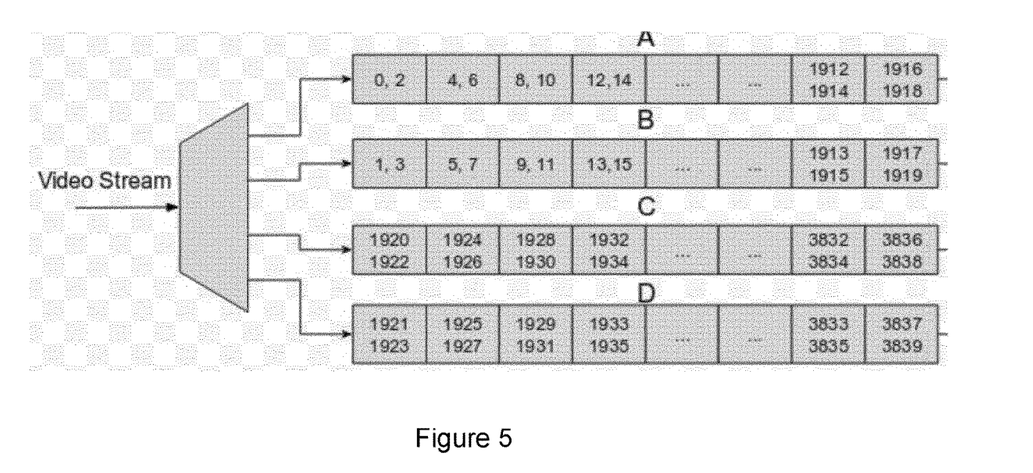

As shown in FIG. 4 with this method 1 line requires 2 buffers each 960 registers long. The longer the buffers the more lines can be stored and the more memory is used. For this application the registers are 32-bits. By using a YUV-422 colour space each pixel can be represented in 16-bits. This means that each register can store 2 pixels, effectively doubling the memory efficiency, as illustrated in FIG. 5.

This changes the write format into two phases. On clock cycles 0 and 1, the pixels are held and then concatenated with the next 2 pixels and written to memory on cycles 2 and 3. This block is active when input signal 'de'=1 and is reset when input 'vs'=1.

The grid generator block is configured for interpolating pixel coordinates between grid points and providing that pixel information to the video read block. The coordinate points of the grid are written by a software application in to on chip RAM and read by the grid generator block. Each on chip RAM register contains a 16-bit x and y coordinate and are arranged in such a way so that any square 4 can be read in 1 clock cycle, similar to the video write block. The main difference is that since the lines are an odd number wide (19) the even numbers are stored in buffers A and D instead of A and C. This block is fed by the pixel counter which it uses to determine where in the grid the current output is. It uses interpolation to determine the current pixel coordinate which it then outputs as 2 separate fixed point integer values, Xoff and Yoff.

Figure 6:
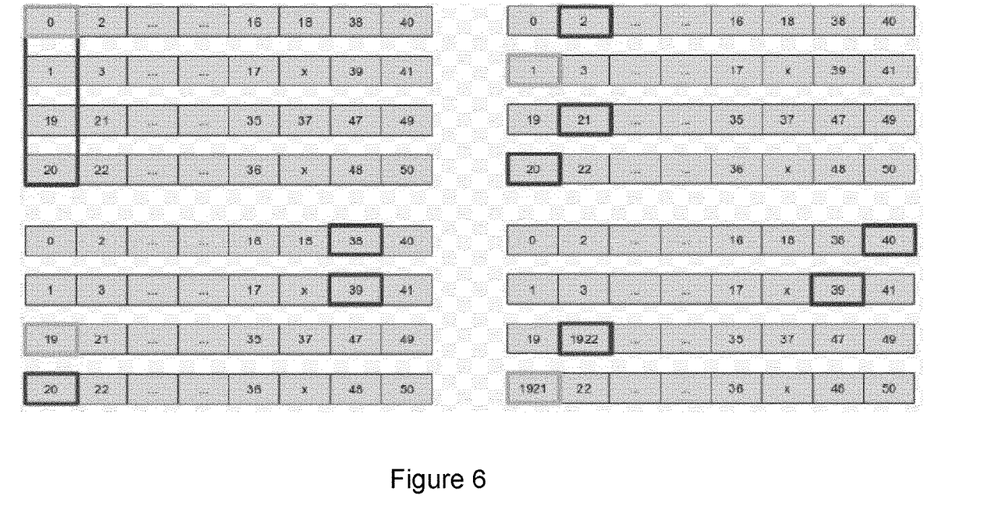
FIG. 6 shows the pixel coordinate locations in the four buffers based off the top left coordinate shown.

As PC increments across a line this block checks which grid points it should be using to interpolate. Every ~107 pixels the grid points used shift over and every 60 lines they shift down. Locating the points in on chip RAM takes its own piece of logic as well as they are structured in a specific way. All the even lines are in buffers A and B and all even columns are in buffers A and C. The block needs to know which buffer and where in that buffer the top left value is stored. With this knowledge the location of the other three values is known. FIG. 6 shows the pixel coordinate locations in the four buffers based off the top left coordinate shown.

The block keeps track of the row and column number and checks their parity to determine the correct buffer order. It also needs to know the memory location in the buffers. Since multiple lines are stored in each buffer it is necessary to find the correct offset depending on the relevant line numbers. Once the four values are read in they are interpolated and the result is output for the video read block.

The Video Read block is where the image correction takes place. The PC and LC inputs dictate which pixel on the screen is being displayed while the Xoff and Yoff inputs tell the block what pixel to put there. The method for locating the correct pixel is the same as the grid generator with the additional complexity of determining which of the two pixels in each register is the correct one.

Figure 7:
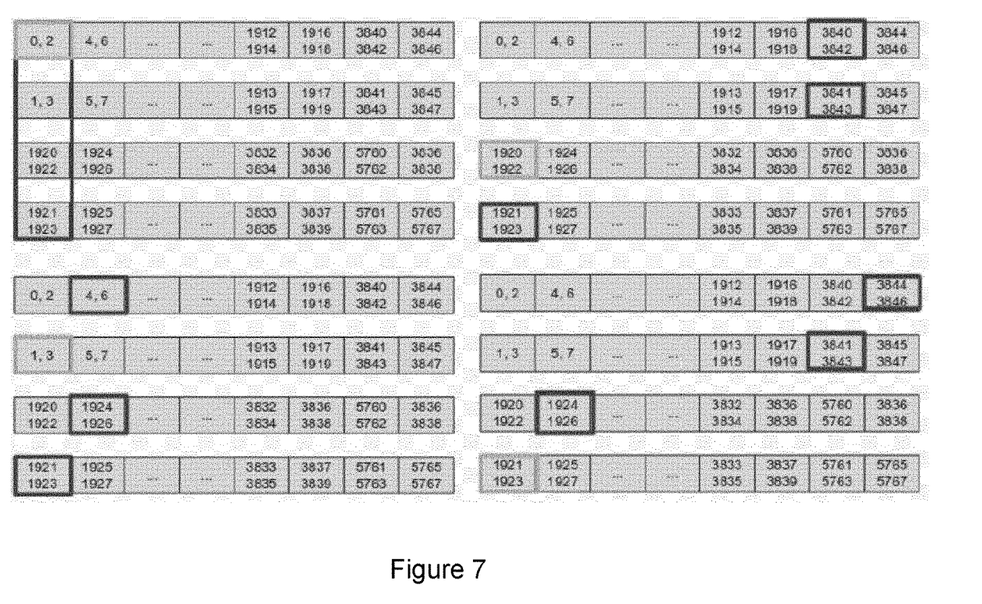
FIG. 7 illustrates The same pixel coordinate locations using 2 pixels per location instead of 1.

As shown in FIG. 7 the Xoff and Yoff values are truncated which gives the top left value. The parity is then determined and buffer offset found to find the locations within the buffers. This section is identical to the method used in the grid generator.

Additionally it must be determined whether to use the MSBs or LSBs. Looking at the numbers stored in the buffers above there is a pattern. The MSBs of buffers A and C are evenly divisible by four while the LSBs give a remainder of two. For buffers B and D, the MSBs give a remainder of 1 and the LSBs a remainder of 3. Dividing the pixel number by 4 and looking at the remainder of the division tells us which to take. Once the correct pixel values are read in from the buffers they are interpolated using bilinear interpolation and streamed out.

For another embodiment with interpolation greater than bilinear (trilinear, cubic etc.), based on a kernel of 9 pixels, additional buffers are required but the structure remains very similar.

| A | B | C | A | B | C | A | B |
| D | E | F | D | E | F | D | E |
| G | H | I | G | H | I | G | H |
| A | B | C | A | B | C | A | B |

Chromatic Distortion Correction

Figure 8:
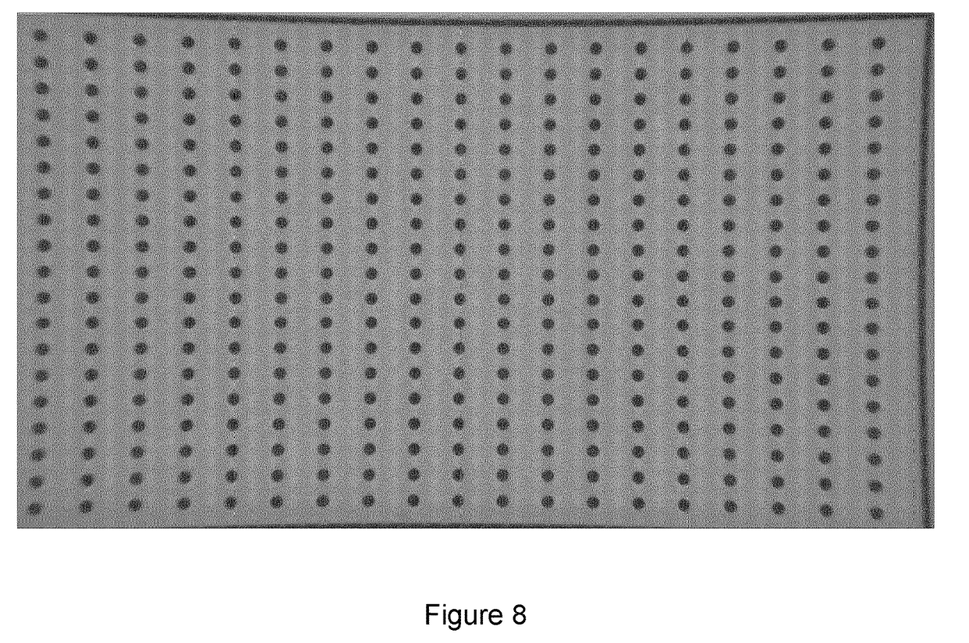
FIG. 8 illustrates chromatic distortion causing coloured fringes on edges facing the centre and on edges facing away from the centre with a different colour.
Figure 9:
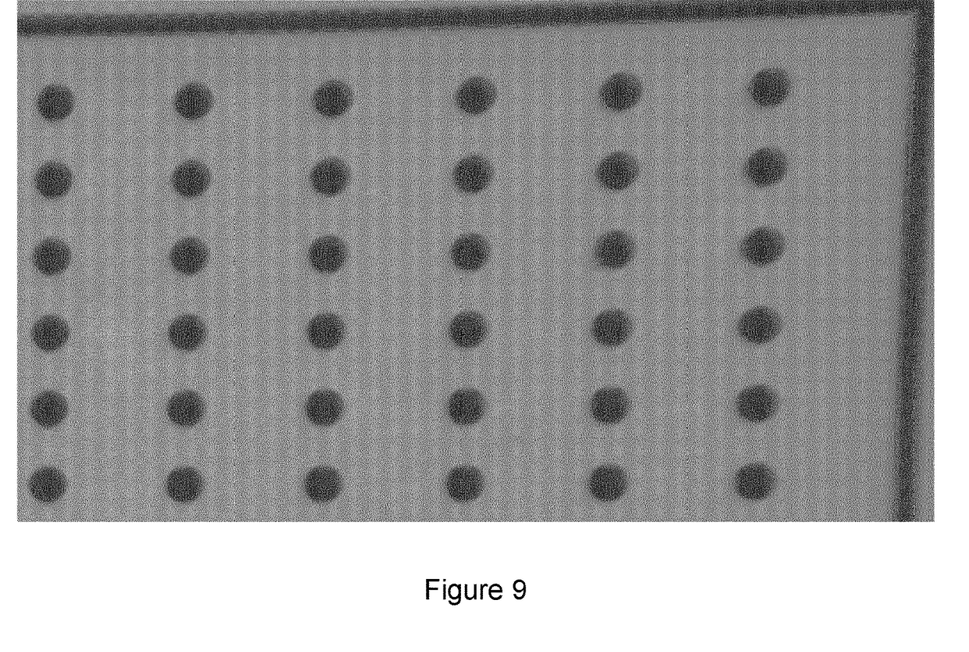
FIG. 9 is a more detailed view of FIG. 8.

As already mentioned, chromatic distortion occurs when a lens fails to focus all colour wavelengths on to the same point resulting in colours having different focal lengths. This appears as fringe colouring around the outer parts of the image. Depending on the nature of the lens different colours will appear on certain edges, as illustrated in FIG. 8. FIG. 8 illustrates chromatic distortion causing coloured fringes on edges facing the centre and on edges facing away from the centre with a different colour. FIG. 9 is a more detailed view of FIG. 8.

In one embodiment of the invention an integrated digital imaging system is provided comprising a video buffer write block and a video buffer read block is configured to correct chromatic distortion errors in an image appearing on the screen. The same technique described above to correct lens distortion is applied however the correction is performed on each colour channel separately. This has the effect of remapping colours to different pixels in an effort to re-align the colour channels. In addition to the video buffer write block and the video buffer read block, a pixel counter block is provided and configured to calculate coordinates an a per channel basis.

The video write block operates in the same way as described with respect to the lens distortion with the exception that data is now written per colour channel.

Figure 10:
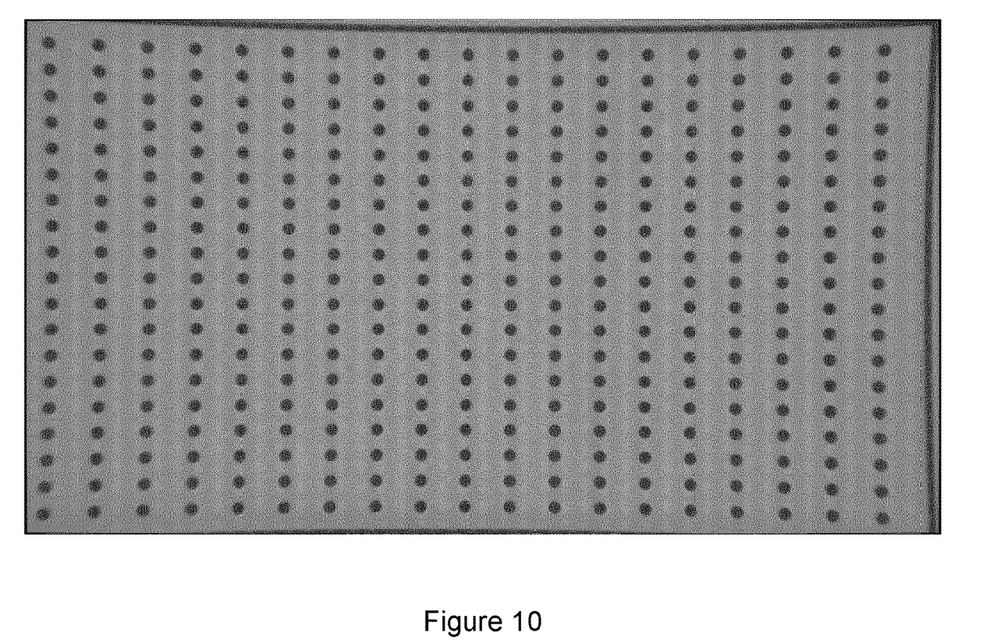
FIG. 10 illustrates the image of FIG. 8 corrected with the chromatic distortion eliminated.
Figure 11:
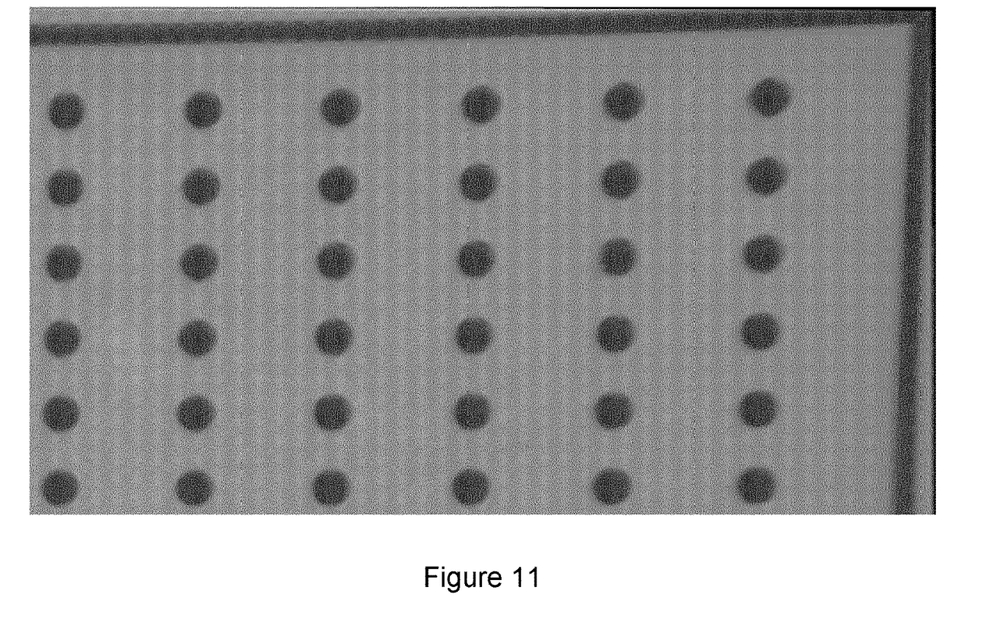
FIG. 11 is a more detailed view of FIG. 10 showing the chromatic distortion removed.

The total memory usage does not need to change but it is now spread over more buffers. Instead of using coordinates provided by a grid generator block, the video read block calculates the coordinates based on a 'k' value on the fly. Coordinates are calculated per channel. FIG. 10 illustrates the image of FIG. 8 corrected with the chromatic distortion eliminated, while FIG. 11 is a more detailed view of FIG. 10 showing the chromatic distortion removed.

Combined Lens and Chromatic Distortion Correction

In another embodiment of the invention both lens distortion correction and chromatic distortion correction can be combined on the same digital microscope system. The system is configured to write pixels into buffers per channel, to take account of the chromatic distortion.

This allows the system to correct for both lens distortion and chromatic distortion in one step. By combining both systems into one memory usage is also saved as video data is only stored once and can be used for both function of lens and chromatic distortion correction.

This system uses the same techniques used described above and comprises four main blocks;
video buffer write block,
video buffer read block,
grid generator block,
pixel counter block, In operation the video write block is identical to the write block described above with respect to chromatic distortion. The video read block closely resembles the description for the lens distortion correction, however the video read block is adapted to accept coordinates for each colour channel and to read from 12 buffers (4 per channel). The grid generator block has been expanded to generate coordinates for each colour channel. The pixel counter block is provided and configured to calculate coordinates on a per channel basis.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, FLASH, or magnetic recording medium, e.g. a memory stick or hard disk. The carrier may be an electrical or optical signal which may be transmitted via an electrical or an optical cable or by radio or other means.

It will be appreciated that in the context of the present invention that the term 'graticule' can be interpreted broadly and to mean 'reticle' as the terms are technically equivalent.

It will be further appreciated that the invention can be applied to testing objects in a range of industries, for example Medical Devices, Electronic Component testing and objects that require testing of Precision Engineering objects.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An integrated digital microscope system comprising a camera, a lens and a screen to view an object characterized in that an integrated circuit comprises a video buffer write block, a grid generator block, and a video buffer read block configured to correct lens distortion errors in an image appearing on said screen, further comprising a pixel counter block connected to the grid generator block and configured for interpolating pixel coordinates between a plurality of grid points and providing the pixel information to the video read block, wherein the grid points are stored by a software application in a plurality of registers and read by the grid generator block wherein the registers contain an x and y coordinate with information to describe its position, wherein the grid points are arranged in such a way so that a kernel of adjacent pixels surrounding a pixel of interest can be read in a single clock cycle, wherein the pixel counter block is configured to calculate coordinates on a per channel basis and configured to correct chromatic distortion errors, wherein the video read block calculates the coordinates based on a 'k' value on the fly and the coordinates are calculated on a per channel basis provided by the pixel counter block.

2. The digital microscope system as claimed in claim 1 wherein the integrated circuit comprises a Field Programmable Gate Array (FPGA) device.

3. The digital microscope system as claimed in claim 1 wherein the video write block stores pixel data in a format configured to accommodate for interpolation in the video read block.

4. The digital microscope system as claimed in claim 1 comprising at least four memory buffers wherein pixels are stored in such a way that a rectangle of adjacent pixels can be read at any time in a single clock cycle of the integrated circuit.

5. The digital microscope system as claimed in claim 4 wherein at least one memory buffer comprises a plurality of registers and a register can store at least two pixels.

6. The digital microscope system as claimed in claim 1, wherein the video read block is configured to locate the correct pixels from the plurality of buffers and interpolate said pixels such that an image of the object appears on the screen without lens distortion.

7. The digital microscope system as claimed in claim 1 wherein real time lens distortion correction is implemented by the integrated circuit.

8. An integrated digital microscope system comprising a camera, a lens and a screen to view an object characterized in that an integrated circuit comprises a video buffer write block and a video buffer read block configured to correct chromatic distortion errors in the image, further comprising a pixel counter block connected to the grid generator block and configured for interpolating pixel coordinates between a plurality of grid points and providing the pixel information to the video read block, wherein the grid points are stored by a software application in a plurality of registers and read by the grid generator block wherein the registers contain an x and y coordinate with information to describe its position, wherein the grid points are arranged in such a way so that a kernel of adjacent pixels surrounding a pixel of interest can be read in a single clock cycle, wherein the pixel counter block is configured to calculate coordinates on a per channel basis and configured to correct chromatic distortion errors, wherein the video read block calculates the coordinates based on a 'k' value on the fly and the coordinates are calculated on a per channel basis provided by the pixel counter block.

9. A method of displaying an image on a digital imaging system comprising a camera, a lens and a screen to view an object, an integrated circuit having a video buffer write block, a grid generator block, and a video buffer read block comprising the steps of correcting lens distortion errors in an image appearing on said screen, said digital imaging system further comprising a pixel counter block connected to the grid generator block and configured for interpolating pixel coordinates between a plurality of grid points and providing the pixel information to the video read block, wherein the grid points are stored by a software application in a plurality of registers and read by the grid generator block wherein the registers contain an x and y coordinate with information to describe its position, wherein the grid points are arranged in such a way so that a kernel of adjacent pixels surrounding a pixel of interest can be read in a single clock cycle, wherein the pixel counter block is configured to calculate coordinates on a per channel basis and configured to correct chromatic distortion errors, wherein the video read block calculates the coordinates based on a 'k' value on the fly and the coordinates are calculated on a per channel basis provided by the pixel counter block.

* * * * *